March 1, 1927.
J. C. CARLTON
RADIAL DRILL
Filed Aug. 18, 1922
1,619,190
2 Sheets-Sheet 2
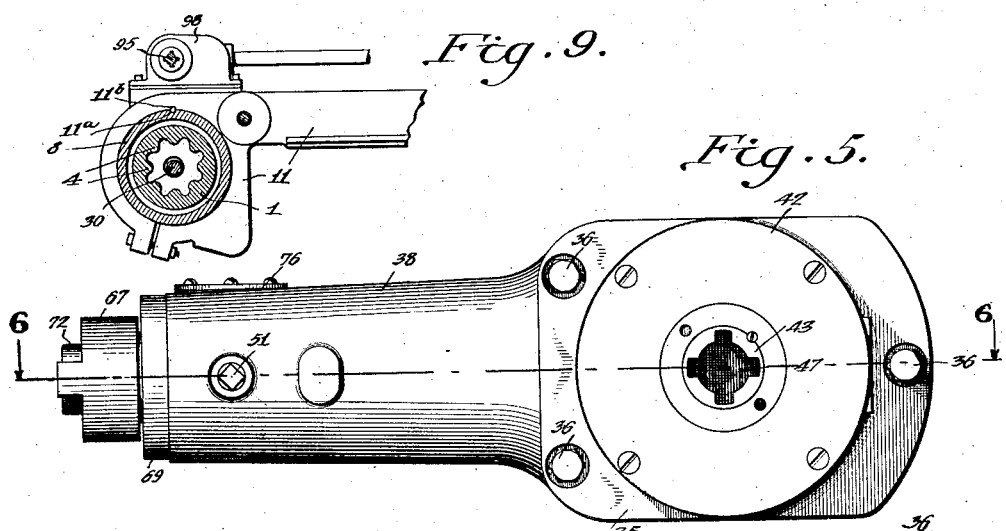
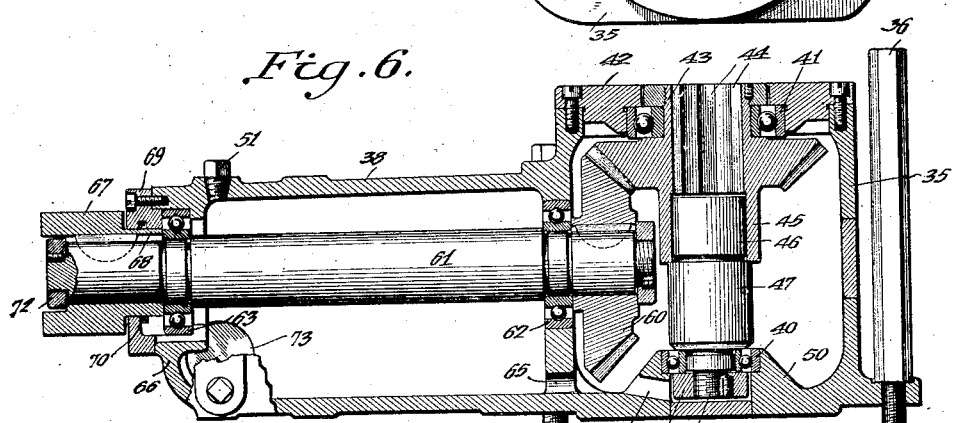
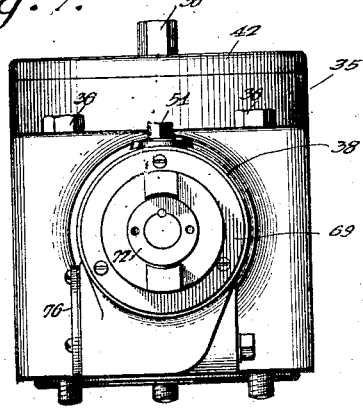
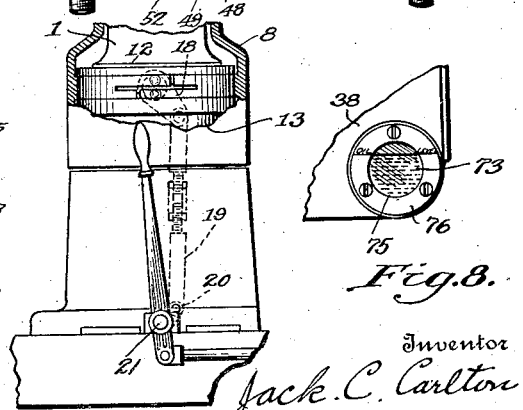
Inventor
Jack C. Carlton
By Wood & Wood
Attorneys Patented Mar. 1, 1927.

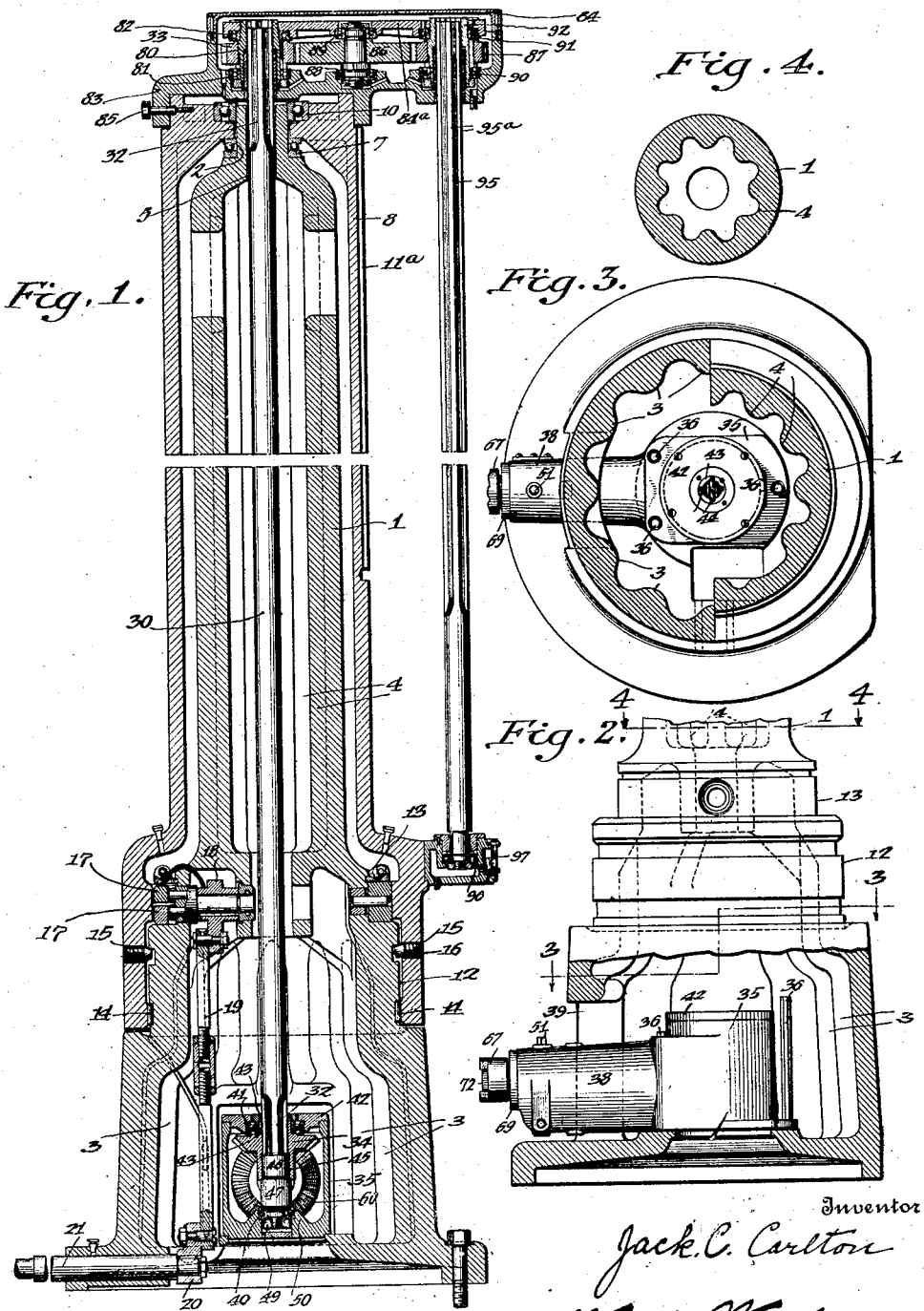

1,619,190

UNITED STATES PATENT OFFICE.

JACK C. CARLTON, OF CINCINNATI, OHIO, ASSIGNOR TO THE CARLTON MACHINE TOOL COMPANY, OF CINCINNATI, OHIO, A CORPORATION OF OHIO.

RADIAL DRILL.

Application filed August 18, 1922. Serial No. 582,751.

This invention relates to drilling machines, and in particular to improvements in a type of machine known as a "radial drill", employing a column for supporting an arm radiating horizontally thereon, the arm carrying a drill and adapted to be elevated and lowered and swung about the column. In such machines the arm is usually mounted upon a sleeve engaged over the column upon which the arm is elevated or lowered and the sleeve revolvable about the column to provide for the swing of the arm. The column, on account of the weight and working strains of the arm, must possess a requisite degree of rigidity to adequately resist the bending stresses to which it is subjected, and many efforts have been made to strengthen the structure without unduly adding to the weight of the column. Also to the method of mounting the sleeve so that it may be freely revolvable about the column, which however has not been successfully accomplished in types in which the base of the sleeve is split for contraction for binding the sleeve to the column, which destroys the equilibrium of the sleeve upon the column and results in undue frictional resistance between the sleeve and column in a rotative capacity when the sleeve is unclamped from the column.

In machine tools of this class where the prime power transmission is located at the base of the column it is necessary to extend a shaft centrally through the column in connecting with transmission gearing at the head of the sleeve so as to revolve with the sleeve and which transmits motion to a vertical shaft outside of the sleeve for connecting with the transmission gearing carried by the arm, for transmitting the drill upon the arm. On account of the length of the column it is only possible to provide bearings at the opposite ends of the column for the shaft centrally engaged therethrough. The shaft is therefore free to vibrate intermediate its bearing, causing it to run untrue, and causing injury to the gears connecting with the opposite ends of the shaft. In the present invention the gearings at the bottom and top of the column are organized as self-contained removable units, transmittingly connected by the column shaft, which is loosely engaged within the column and in bearings of the transmission units. Under such conditions the gearing of the several units may be sustained in an oil bath and features rendered available for eliminating conditions reducing the efficiency and durability of the machine.

An object of the invention is to reduce the weight of the column of the drill and at the same time maintain column rigidity, this object being accomplished by reinforcing the interior of the hollow column with a plurality of ribs or flutes extending longitudinally thereof, substantially from bottom to top.

Another object of the invention is to prevent the transmission gears, at the bottom of the column connecting with the central driving or power shaft, from running out of true, and to correspondingly eliminate the noise incident to such a condition, this object being furthered by mounting the gears in a casing attached to the bottom of the column, the power shaft being slidably connected with one of the transmission gears therewithin, and to support the lower end of the shaft in a ball bearing footstep.

Another object of the invention is to provide for the removal of the lower transmission gears for repair or adjustment, without disassembling the drill, this object being accomplished by providing a transmission casing at the bottom of the column, removable through an opening in the side of the same, the shaft being translatable within and removable from one of the transmission gears within said casing.

Another object of the invention is to provide an oil reservoir about the transmission gearing, and to further provide a sight opening through which the oil level therewithin may be ascertained.

Another object of the invention is the provision of means attached to the sleeve for rotatably suspending the same about the column, said sleeve having mounted thereon the usual translatable work-arm.

Other objects and certain advantages will be more fully set forth in a description of the accompanying drawings forming a part of this application, and in the drawings like characters of reference denote corresponding parts throughout the several views, of which:

Figure 1 is a central vertical section through my improved drilling machine, illustrating the structure and mounting of the central driving or power shaft and related mechanism.

Figure 2 is a sectional elevation at a right angle to Figure 1 showing the position of my improved transmission mechanism, or driving unit, the column sleeve being removed.

Figure 3 is a plan section on line 3—3 of Figure 2.

Figure 4 is a section on line 4—4 of Figure 2, illustrating the ribbed or fluted structure at the upper part of the hollow column.

Figure 5 is a detail plan view of the removable transmission or driving unit.

Figure 6 is a section on line 6—6 of Figure 5.

Figure 7 is an end view of the transmission casing and reservoir.

Figure 8 is a fragmentary detail showing the oil level sight opening, and

Figure 9 is a plan section showing the relation of the drill or work arm mounted upon the sleeve.

Figure 10 is a side view of Figure 1 with the sleeve broken away to show the detail of the clamping mechanism.

In certain types of drilling machines, the power is transmitted from the bottom of the column through a shaft disposed centrally within the column, said shaft being connected at top and bottom with transmission gearing. A bevelled gear is usually attached to the shaft at its lower end and this gear is in mesh with a companion gear which is mounted upon a drive shaft extending radially through and beyond the column, the shaft having a suitable connection thereon for cooperation with a companion connection carried by any suitable motive means. As a result of the whipping action of the shaft, the bevelled gears are caused to run out of true, with consequent uneven wear, resulting in the production of noise. Moreover, it has heretofore been necessary to dismantle the machine to remove the gears for purposes of repair.

In the present invention, the shaft instead of being mounted in bearings is of the floating type and has splined connection with the transmission gears respectively at the upper and lower end of the column, which gears are separately mounted in respective bearings or housings, the shaft being translatable through the gears with which it connects. The gearing at both the bottom and top of the column which the central column shaft connects represent self-contained transmission units applied and removed from the machine in their unit organization, each unit including its own gear casing. The lower transmission unit is engaged through a side opening in the lower part of the column and is supported within and upon the base of the column with a portion thereof projecting from the column. It also provides a footstep for the central shaft and the gearing may be readily coupled to the driven shaft of any type of drive employed. This provides for interchangeability of driving mechanism as the driving connection may be directly with a motor supported upon the base of the machine or with the gearing of a speed change gear box driven by a pulley or otherwise. The lower transmission unit may be removed from the column without removing the central shaft from the column, the shaft having a splined connection with the transmission gearing of said unit. The upper transmission unit is mounted upon a sleeve surrounding the column and, as a unit, readily removable therefrom, and in this instance does not support or suspend the arm-supporting sleeve about the column as is the practice in commercial tools of this type.

Numeral 1 designates a tubular column having enlarged lower end or pedestal base and upper portion of reduced diameter counterturned at its upper end, as at 2, to provide a seat and hub for sleeve supporting bearings.

The interior of the lower portion of the column is provided with a plurality of strengthening ribs or flutes 3 disposed longitudinally of the column, the upper portion of said column being similarly provided with a series of ribs 4. The use of this ribbed or fluted structure provides the maximum column rigidity with the corresponding minimum reduction in weight. The column is bored as at 5 at its top, to provide clearance for a floating driving or power shaft stepped in gears mounted in casings respectively at the top and bottom of the column. The upper end of the column is contracted and counterturned to provide a seat or shoulder and hub extension for supporting a thrust ball bearing 7, and resting upon said bearing is a hollow sleeve 8 suspended from and concentrically surrounding the column and extending to a point near the bottom thereof. The upper end of the sleeve has socketed therein a ball bearing 10 engaged over the hub extension or counterturned portion 2, the bearings 7 and 10 acting to rotatively suspend and centralize the sleeve about the column. Upon this sleeve is slidably keyed the drill arm 11 (see Figure 9) the keyway, by which the arm is connected, being indicated at 11ᵃ, and the key at 11ᵇ. The base of the column is counterturned at 12 and at 13, about which an enlarged lower end of the sleeve is loosely fitted, said sleeve being concentrically spaced therefrom by suitable roller bearings 14 disposed between the base and sleeve. Upward movement of the sleeve is prevented by screws 15 projected into a groove 16 of the column or base. Means for fastening the sleeve against rotation consists of expansible bands 17 surrounding the counterturned portion 13 and interposed between the sleeve and base, said bands being expanded by the oscillating member 18 which is connected by the pitman 19 to the crank 20 mounted on power shaft 21.

The shaft 21 may be turned in opposite directions respectively to expand or contract the bands and correspondingly clamp and unclamp the sleeve. Mounted within the column is a floating driving or power shaft 30 disposed vertically therein, the shaft being flutted or ribbed throughout a portion of its length at each end as at 31, 32, to provide keys engageable with corresponding grooves of the sleeve of the gear 33 and gear 34 respectively of the gear transmission unit upon the sleeve 8 at the top thereof and within the base of the column at its bottom. The lower gear transmission unit comprising gear 34 is mounted within a casing and oil reservoir 35 attached by screws 36 to the bottom of the base or column, said casing having a cylindrical extension 38 projecting through an opening 39 in the base of the column and extending beyond the column. The opening 39 is of sufficient size to allow the removal of the casing 35 therethrough. The bevelled gear 34 is mounted in ball bearings 40, 41, one member of the bearing 41 being held in a cap-plate or cover 42 attached by suitable fastening devices to the casing 35, the other member of the bearing being fitted upon the hub extension 43 of the gear, the extension and gear being bored and milled to provide multiple spline grooves 44 into which fit the corresponding spline ribs 32 of the shaft 30. The grooves extend part way through the gear, said gear being provided with a lower sleeve or hub extension 45 into which is tightly fitted the counterturned portion 46 of a stub shaft 47, the lower end of which shaft engages the inner ring of the bearing 40, and said shaft is provided with a screw extension 48 having a nut 49 engaged against the inner ring as a securing means, the stub shaft 47 and gear forming a footstep upon which the driving shaft 30 is supported. The outer ring of the bearing 44 is seated within a socket of the casing 35, said socket formed in an upwardly projecting portion 50. The casing 35 is closed and sealed to provide an oil reservoir which may be filled through a suitable opening in the extension 38, closed by plug 51. A passage 52 is provided through which the oil may reach the lower bearing 40.

In mesh with the bevelled gear 34 is a second bevelled gear 60, keyed to a driving shaft 61 mounted horizontally in bearings 62, 63, said shaft projecting beyond the end wall of the extension. The bearing 62 is mounted in the division wall 64, oil communication being provided between the casing and the extension by the opening 65. The bearing 63 is mounted in the outer wall 66 of the extension, and a clutch member 67 is keyed to the outer end of the shaft beyond the outer wall of said extension. The clutch member has a reduced sleeve portion 68 rotatively engaged by a cap-plate 69 attached by screws to the end of the casing, said plate providing a packing-receiving groove 70 the packing of which engages the sleeve 68 to prevent the egress of oil. Translative movement of the clutch member is prevented by a nut 72 having threaded engagement with the corresponding extension of the shaft. An oil sight opening 73 is provided in the lower outer portion of the extension 38, the opening being covered by glass or other transparent material 75 suitably clamped by ring 76.

A second gear transmission unit is secured upon the upper end of the sleeve 8. The upper end of the shaft 30 has its spline ribs 31 engaged with the corresponding spline grooves of the sleeve 80 upon which the gear 33 is keyed, said sleeve being supported in bearings 81, 82, stepped respectively in the lower wall of the combined cap, oil reservoir, and gear housing 83, and in a bearing-plate 84ª suitaby attached to the interior side walls of the housing. The combined cap and reservoir is attached to the upper end of the sleeve by suitable fastening devices 85 traversing an annular flange at the bottom of the reservoir only one of said fastening devices being shown. The reservoir houses additional gears 86, 87, in train with the gear 33, said gears being mounted in bearings 88, 89, 90 and 91. A casing or housing cover 84 is provided with a filling opening through which oil may be introduced. Passages are provided in the bottom of the reservoir leading respectively to the bearings 81, 88 and 90.

In splined connection with the sleeve 92 of the gear 87, the mounting of this gear being similar to that of gear 33, is a shaft 95 which has multiple spline ribs 95ª thereon. The lower end of the shaft 95 is stepped in suitable bearings 96 carried by combined oil reservoir and bracket 97 attached to the sleeve near its lower portion. This reservoir provides means for oiling the bearing 96, a sight opening also being provided therefor as in the case of the transmission casing. Shaft 95 has splined connection with the driving gear (not shown) of a speed box 98 attached to the drill or work arm 11. (See Figure 9).

The splined connection of the shaft 30 with the gears 33, 34, permits the shaft to be raised sufficiently to disconnect the lower end thereof from the gear 33 and casing 35, the cover 84 first having been removed, to allow the removal of the transmission casing 35 for adjustment or repair of the transmission mechanism therein. The novel mounting of the shaft prevents undue wearing of the gears 34 and 60, the gear 34 being mounted in a separate bearing, instead of upon the shaft, so that the whipping action of the shaft does not throw the gear out of alignment, as happens in the old constructions. The gearing is, moreover, more easily removed for repairs or adjustment by simply raising the shaft to disengage the lower end from the gear 34.

Providing the radial arm carrying sleeve 8 with a headed end as an integral part of the sleeve, the sleeve is directly suspended from the top of the column, which renders the sleeve more stable upon the column than if the sleeve is suspended from a rotatable cap upon the upper end of the column, a practice heretofore followed.

The utilization of removable transmission units at the head and base of the column, materially reduces column machining as the necessary machining is on the exterior side of the column. The assembling of the machine is greatly simplified as the transmission units can be fully assembled and tested before they are installed in the machine, thereby offering more accuracy in bearing alignment.

Having described my invention, I claim:

1. In a radial drill, a column, a sleeve concentrically and rotatively supported upon and surrounding said column, a cap for said sleeve housing transmission gearing, a second housing removably mounted within the base of said column and projecting beyond the side wall of the same, having transmission gearing therein, and a shaft extending longitudinally of said column having splined connection at each end with a gear of respective transmission gearings.

2. In a radial drill, a column, a sleeve rotatively mounted upon and concentrically surrounding said column, a cap for said sleeve housing transmission gearing, a second housing removably mounted within the base of said column and projecting beyond the side wall of the same, having transmission gearing therein, a shaft extending longitudinally of said column and having splined connection at each end with gears of respective transmission gearings, and means for locking said sleeve to said column.

3. In a radial drill, a column, a sleeve concentrically surrounding said column, a cap for said sleeve housing transmission gearing, a second housing removably mounted within the base of said column, having transmission gearing therein, a shaft extending longitudinally of said column and having splined connection at each end with gears of respective transmission gearings, a bearing at the outer side of said sleeve, and a shaft stepped in said bearing and having splined connection with a gear of the transmission gearing with said cap.

4. In a radial drill, a hollow column having a lateral opening through the base portion thereof, a device for transmitting motion at an angle located normally in the lower portion of the column, said device being bodily removable through said opening, a shaft in said column connecting with and having its lower end rotatively sustained by said device, and transmission gearing mounted upon the top of said sleeve enclosing a journaled gear connecting with the upper end of said shaft, and rotatively sustaining the upper end of said shaft.

5. In a radial drill, a tubular column, having an opening in its lower portion, a sleeve concentrically surrounding said column, rotatively mounted thereon, a cap upon said sleeve for housing transmission gearing, a second housing attached within the base of said column having a portion projecting through said opening and beyond the side wall of said column and having transmission gearing therein, said housing removable through said opening, and a shaft extending longitudinally of said column having splined connection with a gear of the respective transmission gearings, said shaft translatable within said gears for disconnecting the same from the lower gear to allow removal of said second housing.

6. In a radial drill, a tubular column, having an opening in its lower portion, a sleeve concentrically surrounding said column, rotatively mounted thereon, a cap upon said sleeve for housing transmission gearing, a second housing attached within the base of said column having a portion projecting through said opening and beyond the side wall of said column and having transmission gearing therein, said housing removable through said opening, a shaft extending longitudinally of said base having splined connection with a gear of the respective transmission gearings, said shaft translatable within said gears, a bearing at the outer side of said sleeve, and a shaft stepped in said bearing and having splined connection with a gear of the transmission gearing of said cap.

7. In a radial drill, a hollow column formed with a lateral opening through the lower portion thereof, a sleeve rotatively journaled on said column, a transmission unit bodily insertable through said opening and secured within said column, having gearing independently journaled, a transmission unit bodily mounted upon the top of the sleeve having a gear independently journaled, a shaft lengthwise within the column having its opposed ends respectively removably engaged into said independently journaled gears for transmittingly connecting said transmission units.

8. In a radial drill, a hollow column, a sleeve rotatively journaled on said column, a self-contained transmission unit mounted in the lower portion of said column, a second self-contained transmission unit mounted upon the upper end of said sleeve, and a shaft lengthwise within the column having its opposite ends respectively connected and journaled with said transmission units.

9. In a radial drill, a tubular base, having an opening in its lower portion, a sleeve concentrically surrounding said base rotatably mounted thereon, a housing upon said sleeve enclosing transmission gearing, a second housing removably attached within said base and projecting through said opening and having transmission gearing therein, said housing removable through said opening, a shaft extending longitudinally within said base having splined connection with a gear of a respective transmission gearing, a bearing at the outer side of said sleeve, and a shaft stepped in said bearing having splined connection with a gear of the transmission gearing of said first mentioned housing.

10. A radial drill combining a column, a shaft longitudinally free within said column, a transmission casing removably supported within the base of said column, transmission gearing journaled within said casing and a journal support for rotatively supporting said shaft journaled within said transmission casing, said shaft connecting with said transmission gearing.

11. A radial drill combining a column, a shaft longitudinally free within said column, a transmission casing removably supported within the base of said column, a gear journaled within said casing, for connecting with and providing a journal for said shaft, and transmission means mounted upon the top of said column connecting with and providing a bearing for the upper end of said shaft.

12. A radial drill combining a column, a shaft longitudinally free within said column, a transmission casing removably supported within the base of said column, transmission gearing journaled within said casing, one element thereof providing a journal for rotatively supporting said shaft, and connecting with said element and transmission means mounted upon the top of said column connecting with and providing a bearing for the upper end of said shaft.

13. A radial drill combining a column, a shaft longitudinally free within said column and having its opposite ends respectively plural splined, a transmission casing removably supported within the base of said column, a gear journaled within said casing, for connecting with and providing a journal for said shaft, and transmission means mounted upon the top of said column connecting with and providing a bearing for the upper end of said shaft, the splined ends of said shaft rendering said shaft freely removable longitudinally from said gear and transmission means.

14. A radial drill combining a column, a shaft longitudinally free within said column, a transmission casing removably supported within the base of said column, a gear journaled within said casing for connecting with and providing a journal for said shaft, a transmission casing supported upon the top of said column, and a gear journaled in said second casing connecting with the upper end of said shaft and providing a bearing therefor.

15. A radial drill combining a base; a column extending therefrom having an opening at the juncture of the column and base; a device for transmitting motion at an angle located normally in the lower portion of said column, said device being bodily removable through said opening; a shaft journaled in said column and adapted to be connected with said device; and an external shaft extending parallel with said base and connected within said column with said device.

16. A radial drill combining a substantially horizontal base; a hollow post secured thereto and extending upwardly therefrom and provided at its lower end with a portal; a sleeve rotatably journaled on said post; a radial arm adjustably secured upon said sleeve; a driving shaft extending lengthwise of said base; a driven shaft journaled lengthwise within said post; a gear-unit bodily insertable through said portal for operatively connecting said shafts, said gear unit comprising a frame and a plurality of intermeshing gears carried thereby; and means for supporting said gear-unit.

17. A radial drill combining a substantially horizontal base; a hollow post secured thereto and extending upwardly therefrom and provided with a portal; a sleeve rotatably journaled on said post; a radial arm adjustably secured to said sleeve; a driving shaft extending lengthwise of said base; a driven shaft journaled lengthwise within said post; a power transmission unit bodily insertable through said portal and connecting said shafts, said power transmission unit comprising a frame and a plurality of power transmitting elements carried thereby and operatively connected with said shafts and means for supporting said power transmission unit upon said base.

18. A radial drill combining a base provided with a recess; a column extending upwardly from said base and formed with an opening and registry with said recess; a power shaft journaled lengthwise of said base; a driven shaft journaled lengthwise of said column; a gear unit insertable through said opening for operatively connecting said shafts, said gear unit comprising a frame and two intermeshing bevel gears one of which is adapted to be connected to the power shaft and the other of which is adapted to be connected to the driven shaft and means for supporting said gear-unit with a portion thereof extending into said recess.

19. A radial drill combining a base; a post secured to said base and provided with a portal; a sleeve rotatably journaled on said post and maintained entirely above the plane of said portal; a radial arm vertically adjustable upon said sleeve; a driving shaft extending lengthwise of said base; a driven shaft lengthwise of said post; a power transmission unit bodily insertable through said portal after the base and post have been secured together, said transmission unit comprising a frame and a plurality of power transmitting elements operatively connecting said shafts; guides provided by the base for locating said transmission unit; and means for securing said transmission unit in operative position.

20. A machine tool combining a base formed in its upper surface with a recess providing parallel slide-ways; a post secured upon said base and provided with a portal overlying said recess; a sleeve rotatably journaled on said post; a driving shaft; a driven shaft; a transmission unit insertable through said portal and into said post beneath said sleeve for operatively connecting said shafts, said transmission unit comprising a frame removably secured in said guideways and a pair of intermeshing gears one of which is splined to each of said shafts; and means for securing said transmission unit in operative position.

In witness whereof, I hereunto subscribe my name.

JACK C. CARLTON.